United States Patent [19]
Takatsuki

[11] Patent Number: 6,038,082
[45] Date of Patent: Mar. 14, 2000

[54] WIDE-ANGLE ZOOM LENS

[75] Inventor: Akiko Takatsuki, Omiya, Japan

[73] Assignee: Fuji Photo Optical Co., Ltd., Saitama, Japan

[21] Appl. No.: 09/166,181

[22] Filed: Oct. 5, 1998

[30] Foreign Application Priority Data

Nov. 5, 1997 [JP] Japan .................................... 9-319115

[51] Int. Cl.⁷ ................................................ G02B 15/16
[52] U.S. Cl. ........................ 359/688; 359/676; 359/683; 359/684; 359/686
[58] Field of Search ........................... 359/676, 683–686, 359/688, 738–739

[56] References Cited

U.S. PATENT DOCUMENTS

| | | | |
|---|---|---|---|
| 4,491,395 | 1/1985 | Okudaria | 350/427 |
| 5,703,725 | 12/1997 | Aoki | 359/683 |
| 5,760,969 | 6/1998 | Suzuki | 359/688 |
| 5,831,771 | 11/1998 | Suzuki | 359/689 |

FOREIGN PATENT DOCUMENTS

| | | | |
|---|---|---|---|
| 5-72475 | 3/1993 | Japan | G02B 15/16 |
| 6-242378 | 9/1994 | Japan | G02B 15/167 |
| 9-033812 | 2/1997 | Japan | G02B 15/167 |

Primary Examiner—Georgia Epps
Assistant Examiner—David N. Spector
Attorney, Agent, or Firm—Snider & Chao LLP; Ronald R. Snider

[57] ABSTRACT

A high-performance, inexpensive, small-size, and light-weight wide-angle zoom lens suitable for a TV camera is obtained, which comprises, successively from the object side, four groups having positive, negative, negative, and positive refracting powers, respectively, exhibits a half angle of view of about 40 degrees, and favorably corrects aberration. Successively disposed from the object side are a first lens group $G_1$ having a positive refracting power functioning as a focusing part and comprising six sheets of lenses composed of a concave meniscus lens having a convex face directed onto the object side, a biconcave lens, a biconvex lens, a cemented lens made of concave and convex lenses, and a convex meniscus lens having a convex face directed onto the object side; a second lens group $G_2$ functioning as a power-changing part and having a negative refracting power; a third lens group $G_3$ having a negative refracting power for correcting the image face movement caused when changing power; and a fourth lens group $G_4$ which is a relay lens group having a positive refracting power. When changing power from the wide-angle end to the telephoto end, the second and third lens groups $G_2$ and $G_3$ move on the optical axis, while the first and fourth lens groups $G_1$ and $G_4$ are fixed with respect to the image face.

3 Claims, 10 Drawing Sheets

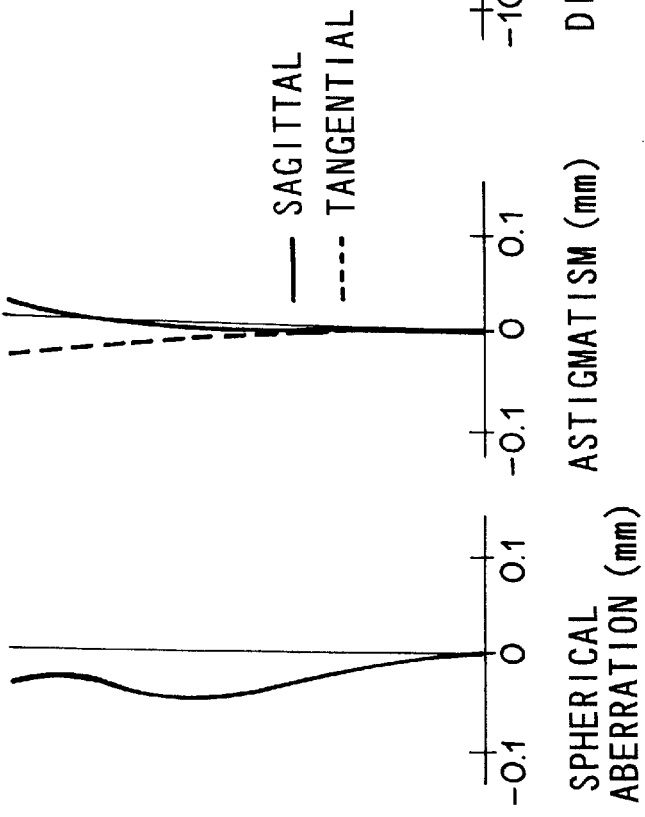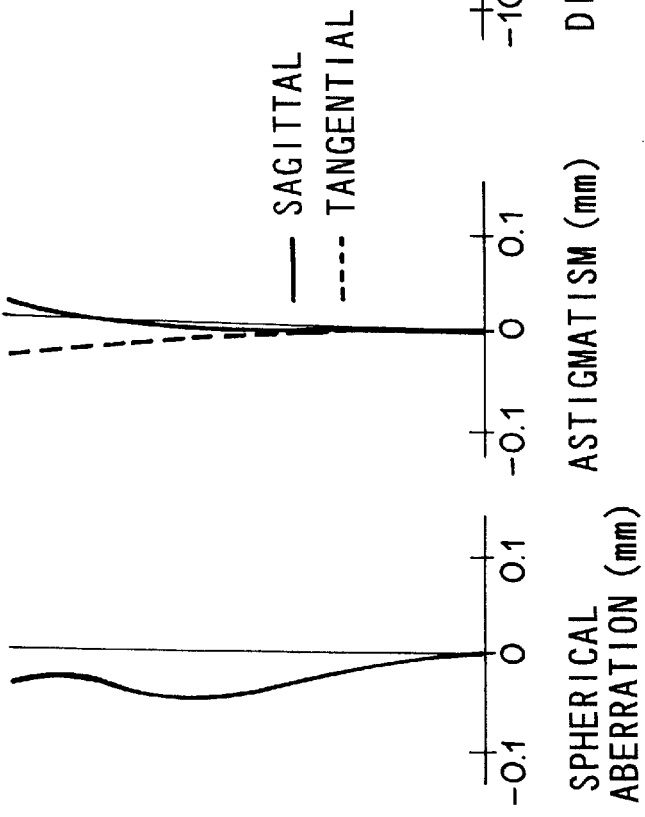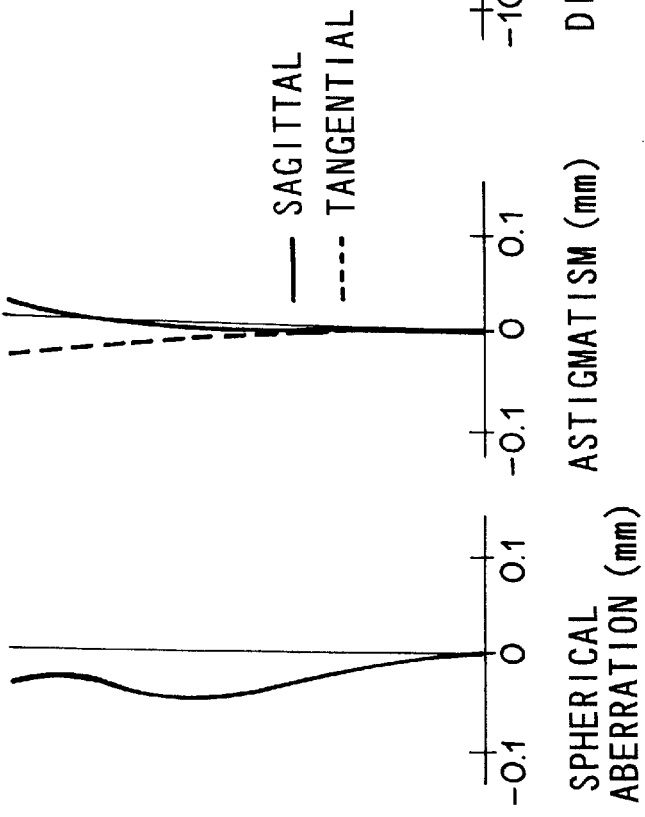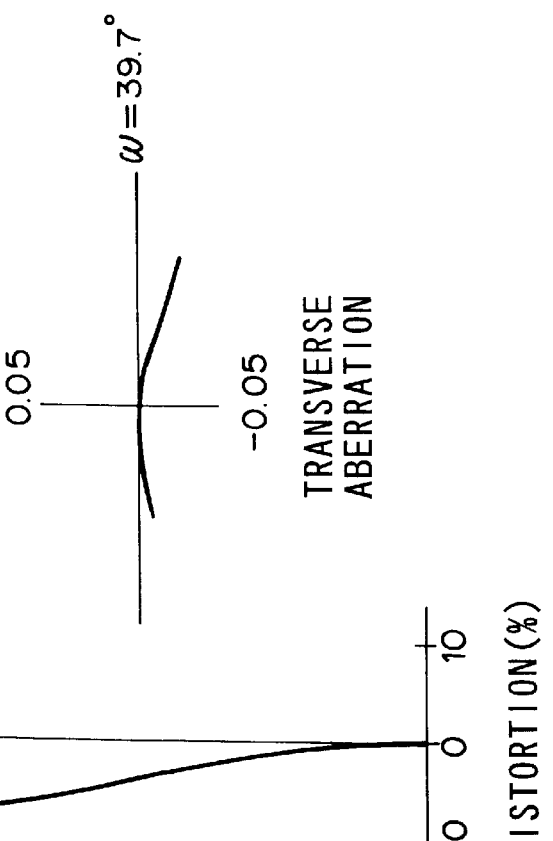

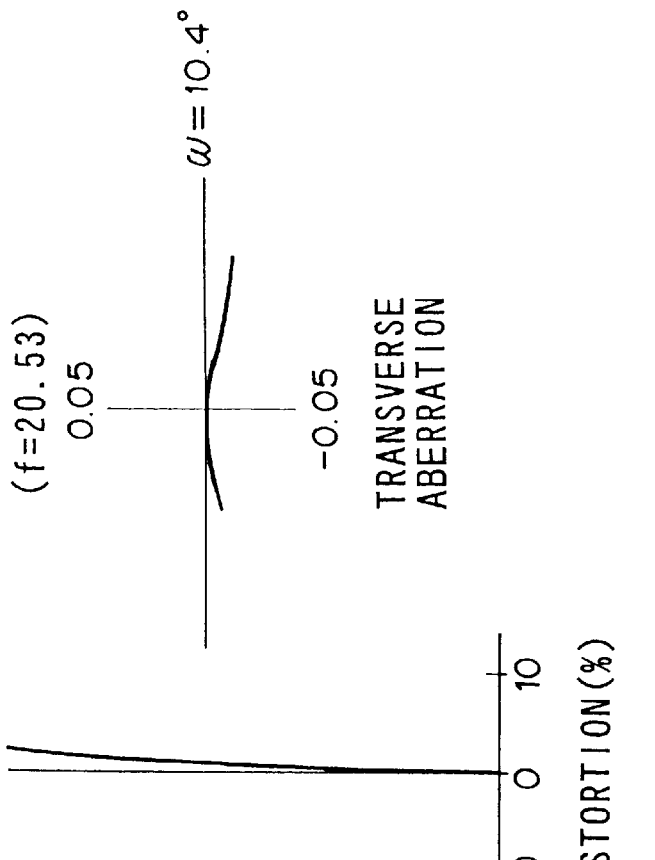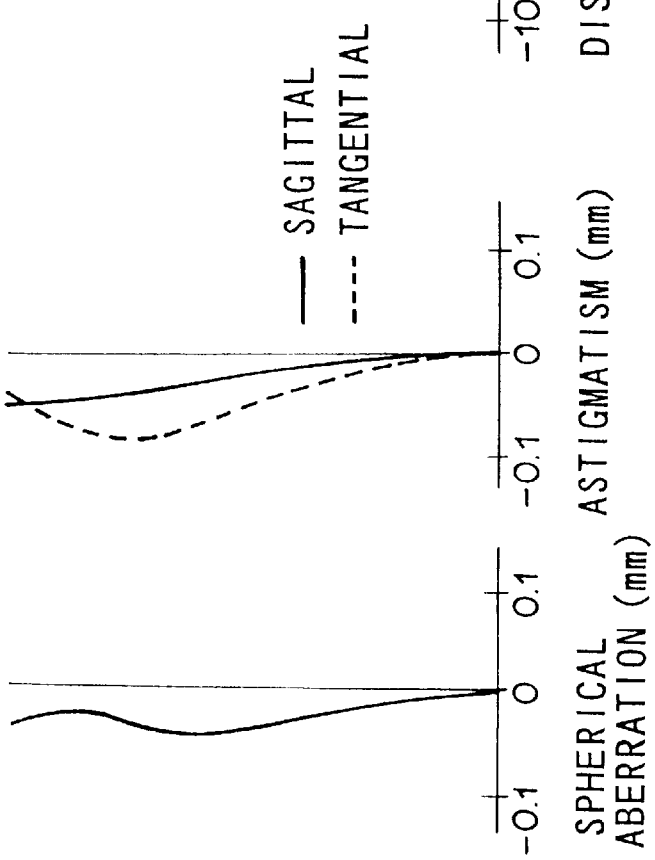

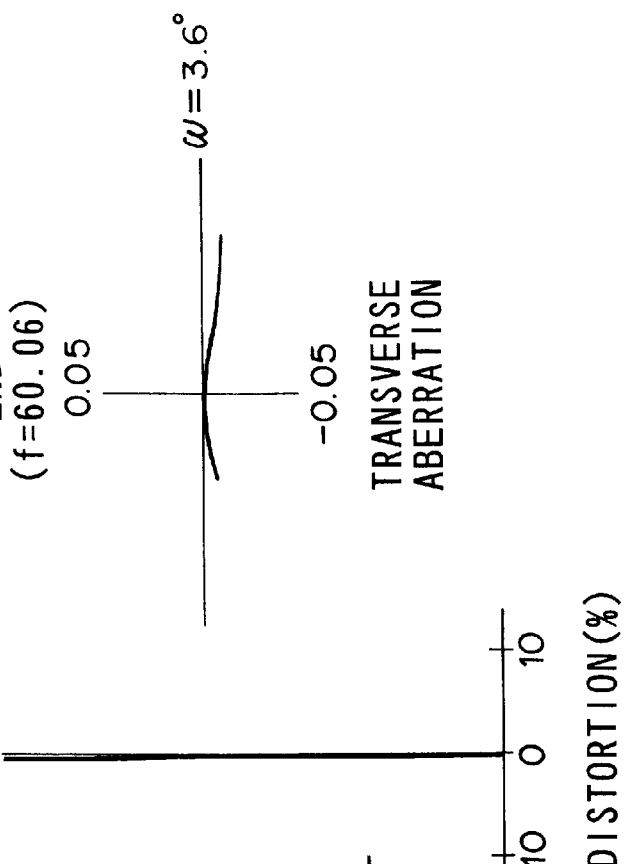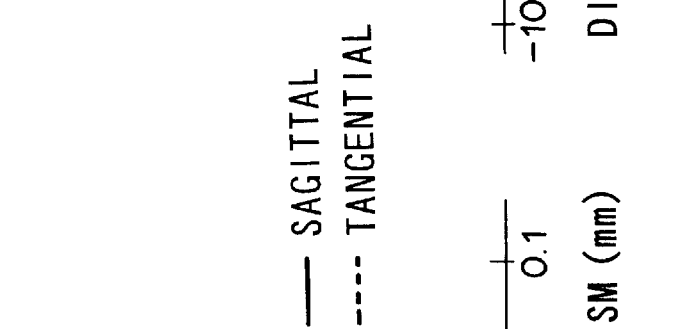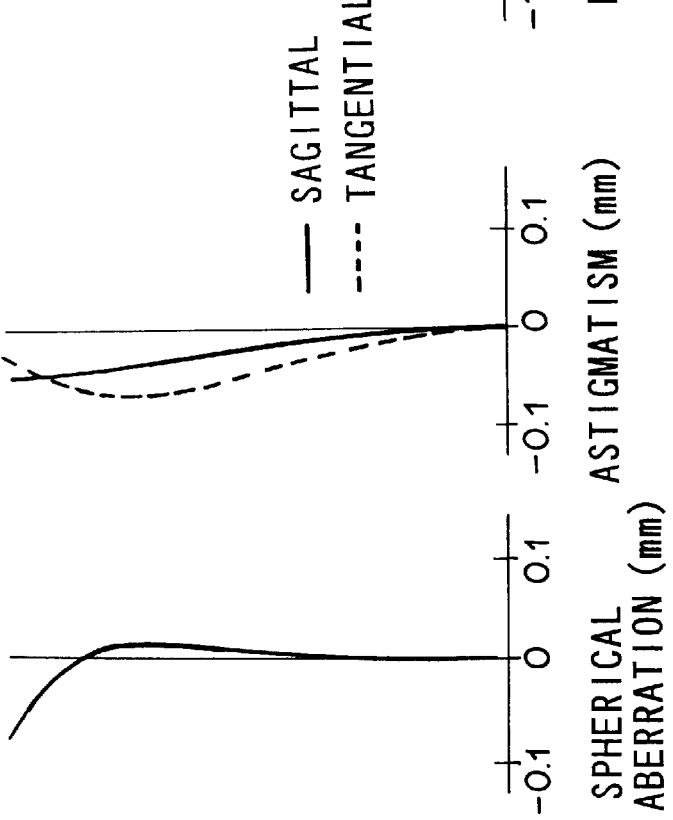

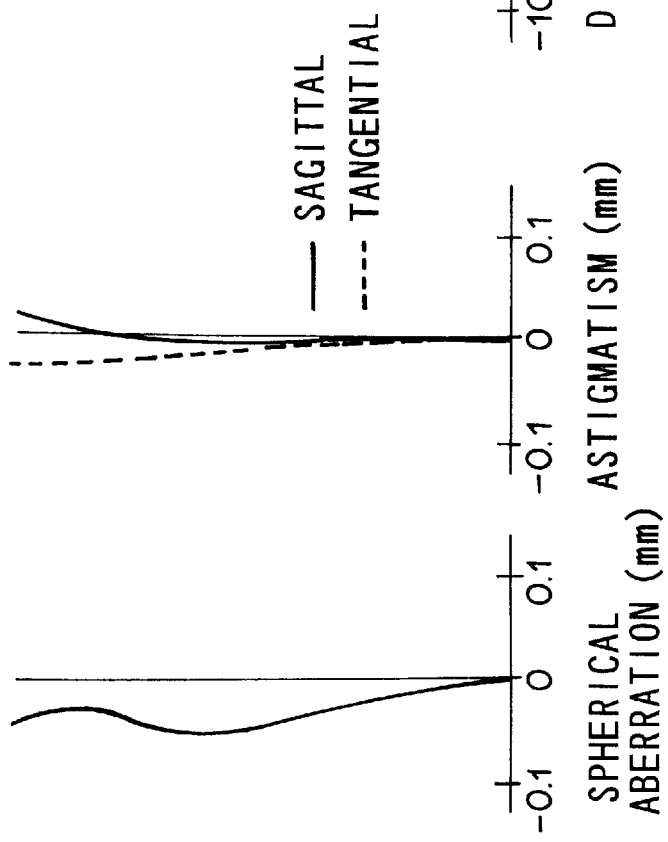

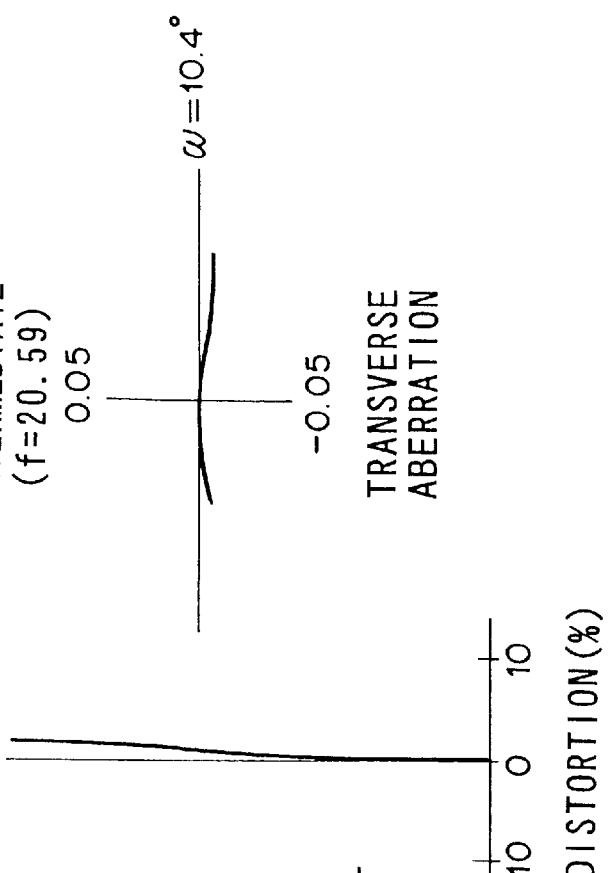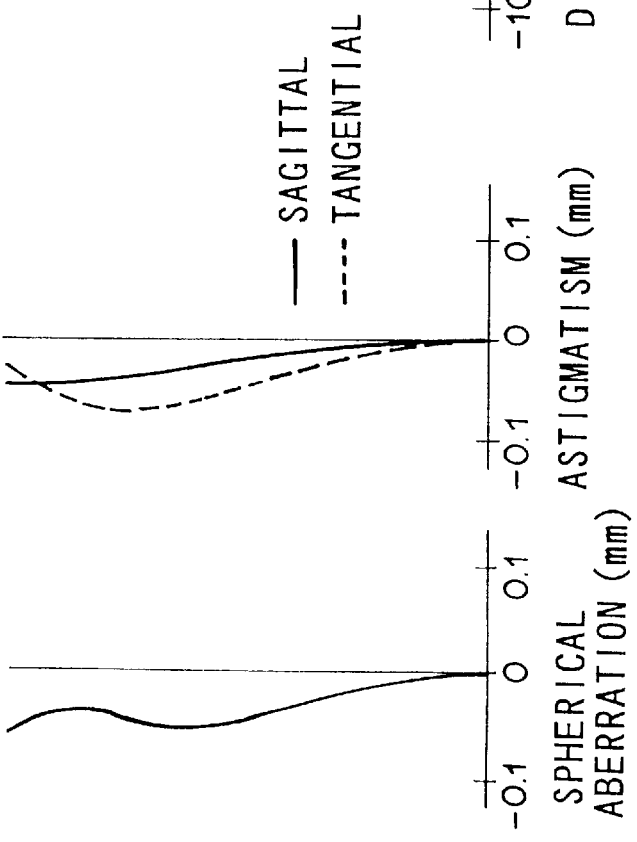

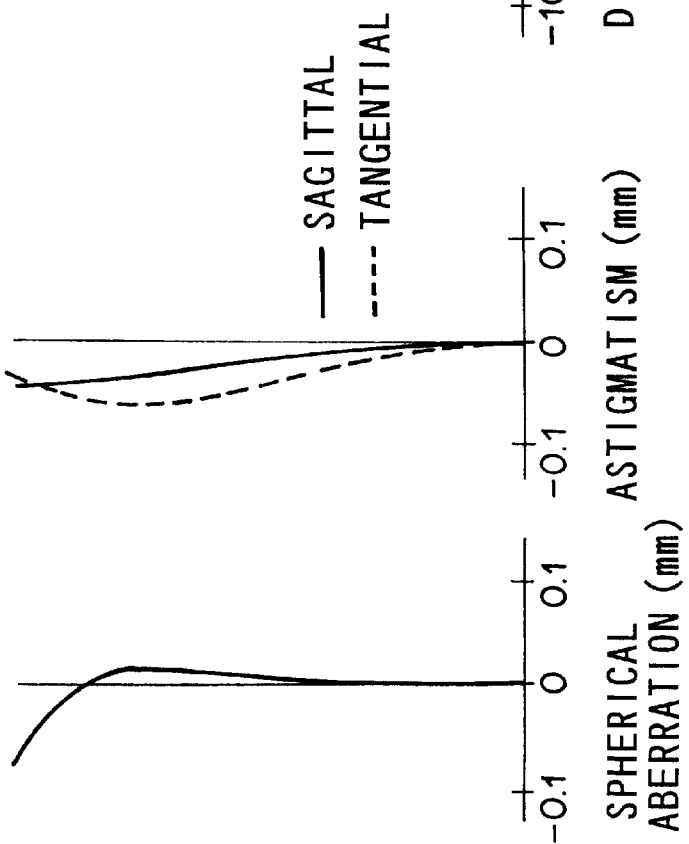

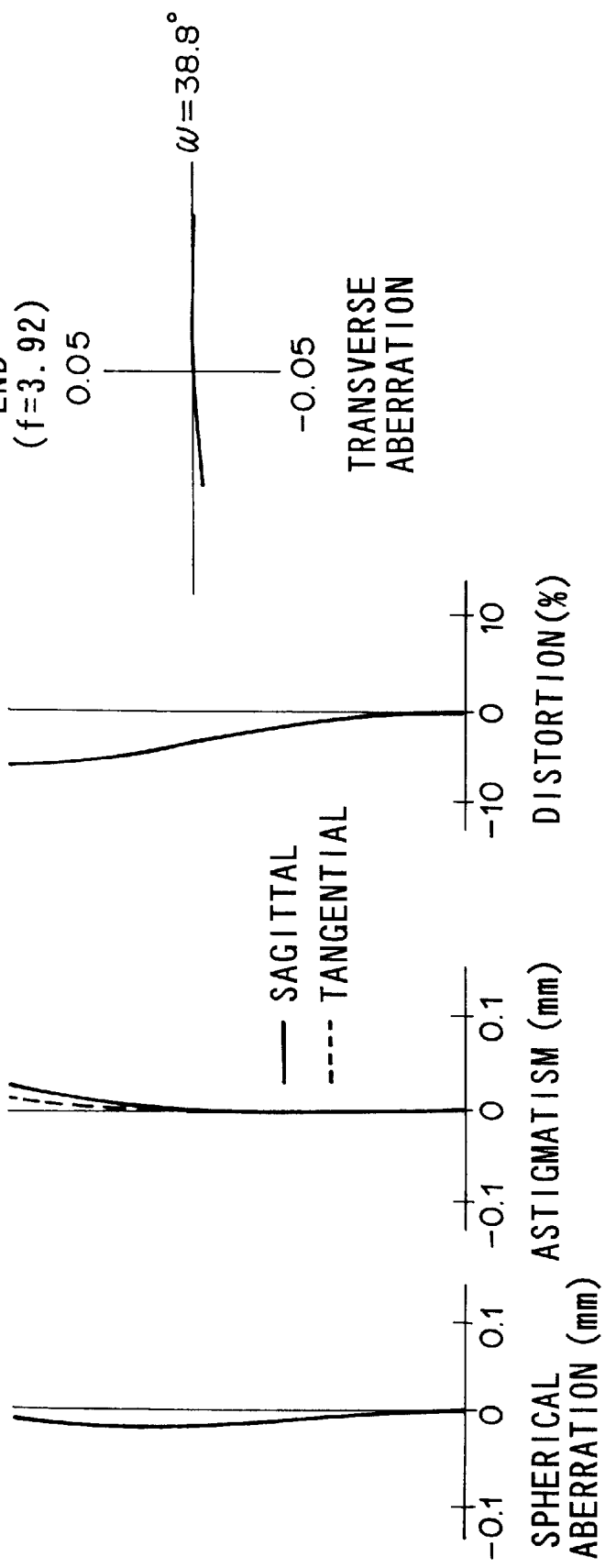

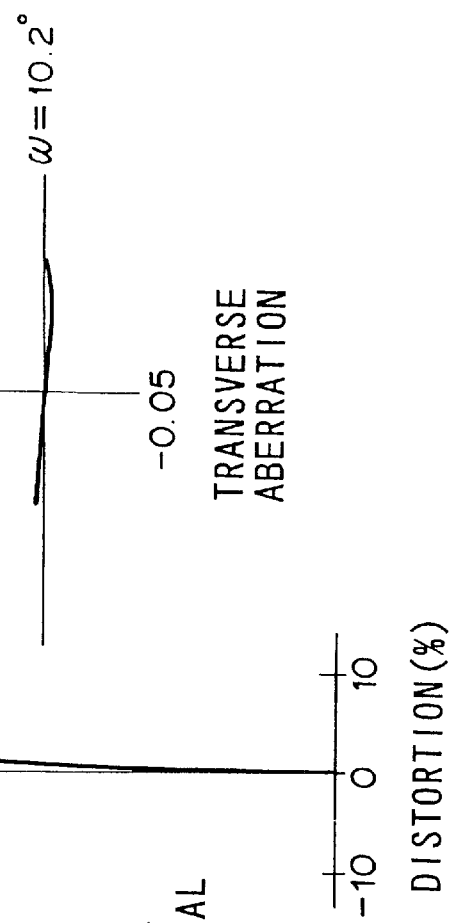
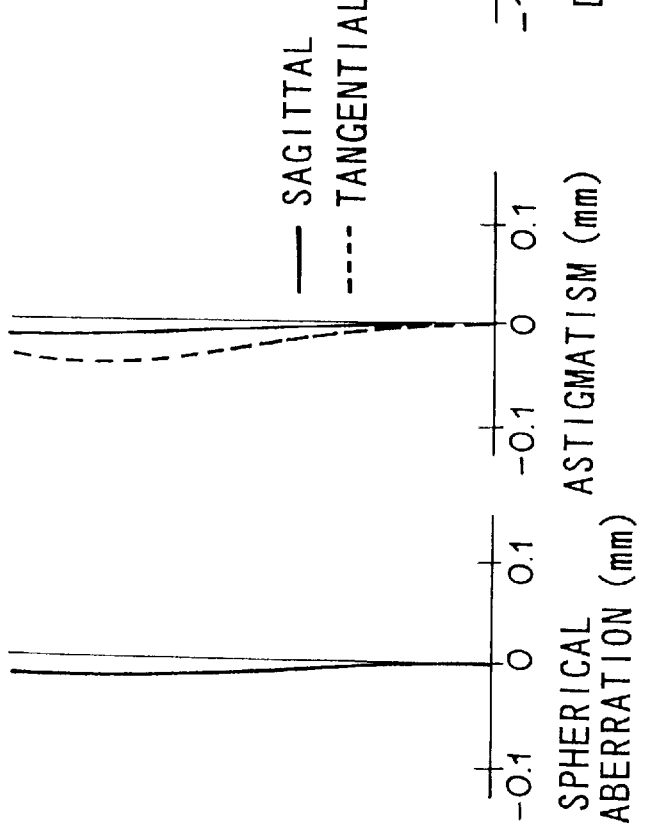

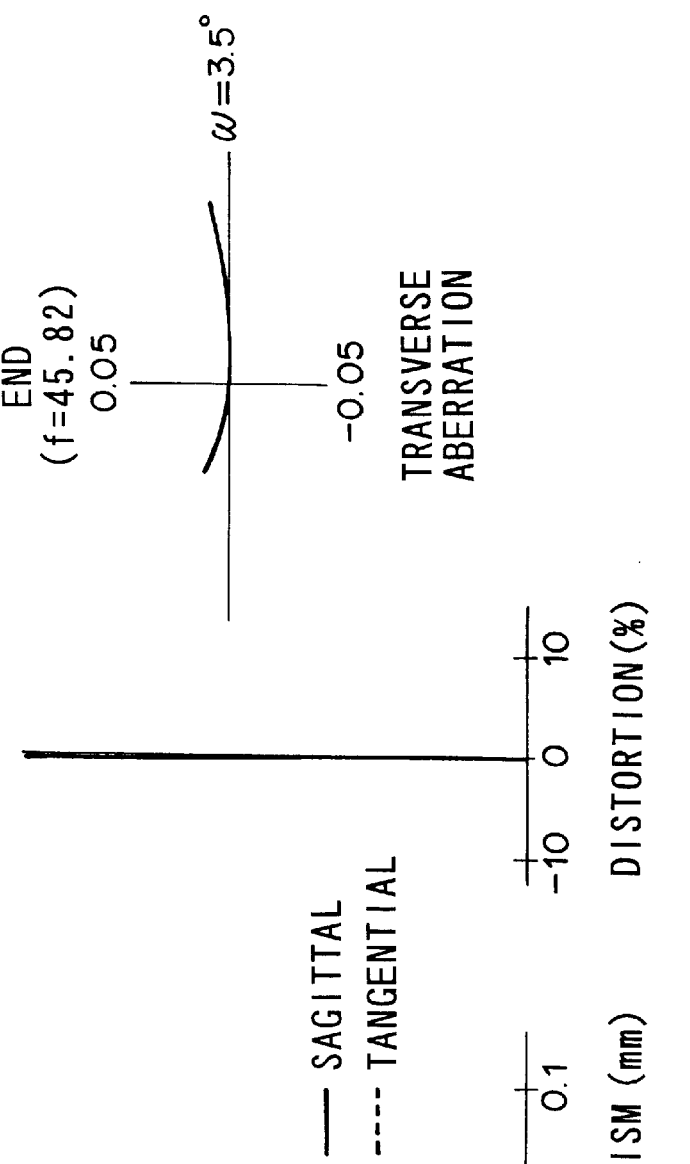

WIDE-ANGLE ZOOM LENS

RELATED APPLICATIONS

This application claims the priority of Japanese Patent Application No. 9-319115 filed on Nov. 5, 1997, which is incorporated herein by reference.

BACKGROUND OF THE INVENTION

1. Field of the Invention

The present invention relates to a zoom lens achieving a wide angle of view represented by a half angle of view of about 40 degrees at its wide-angle end; and, in particular, to a wide-angle zoom lens suitable for a TV camera.

1. Description of the Prior Art

In general, lenses capable of taking pictures with a wide angle of view have been required for video cameras and professional TV cameras. In addition, as imaging devices for video cameras are reducing their size, there has recently been a demand for wide-angle zoom lenses having a small-size lens system as a whole, a high aperture ratio, a high variable power ratio, and a high performance.

In a wide-angle zoom lens, however, the first group tends to have a larger lens diameter, and a larger number of lenses are necessary due to its severe requirement for aberration correction, thus making it difficult to reduce the size and weight of the lens.

Proposed in view of such a demand, for example, are lens systems disclosed in Japanese Unexamined Patent Publication Nos. 5-72475, 6-242378, and 9-33812.

Though the lens system disclosed in Japanese Unexamined Patent Publication No. 5-72475 attempts to reduce its size and weight by using a first lens group having a relatively small number of lenses, i.e., 5, its half angle of view is about 35 degrees, thus leaving a demand for lenses with a wider angle of view.

On the other hand, though the lens system disclosed in Japanese Unexamined Patent Publication No. 6-242378 or 9-33812 achieves a wide angle of view, a first lens group having a large lens diameter is composed of 9 or 10 sheets, thus being disadvantageous from the viewpoint of reducing the size and weight.

SUMMARY OF THE INVENTION

In view of such circumstances, it is an object of the present invention to provide a wide-angle zoom lens which achieves such a wide angle of view that the half angle of view at its wide-angle end is about 40 degrees, while having a high performance, a small size, and a light weight.

The wide-angle zoom lens in accordance with one aspect of the present invention comprises, successively from an object side, a first lens group having a positive refracting power, a second lens group having a negative refracting power, a third lens group having a negative refracting power, and a fourth lens group having a positive refracting power; wherein, when changing power from a wide-angle end to a telephoto end, the second and third lens groups move on an optical axis, while the first and fourth lens groups are fixed with respect to an image face; and wherein the first lens group comprises, successively from the object side, a first lens made of a concave meniscus lens having a convex face directed onto the object side, a second lens made of a biconcave lens, a third lens made of a biconvex lens, fourth and fifth lenses constituting a cemented lens made of concave and convex lenses, and a sixth lens made of a convex meniscus lens having a convex face directed onto the object side.

Preferably, the following conditional expressions (1) to (4) are satisfied:

$$0.52 < R_4/R_5 < 0.77 \tag{1}$$

$$0.37 < D_4/F_{G1} < 0.58 \tag{2}$$

$$-3.0 < (R_2+R_1)/(R_2-R_1) < -1.0 \tag{3}$$

$$0.40 < F_1/F_2 < 1.75 \tag{4}$$

where $R_4$ is the radius of curvature of the image-side face of the second lens;

$R_5$ is the radius of curvature of the object-side face of the third lens;

$D_4$ is the air spacing between the second and third lenses;

$F_{G1}$ is the focal length of the first lens group;

$R_2$ is the radius of curvature of the image-side face of the first lens;

$R_1$ is the radius of curvature of the object-side face of the first lens;

$F_2$ is the focal length of the first lens; and $F_2$ is the focal length of the second lens.

Here, the fourth and fifth lenses constituting the cemented lens made of concave and convex lenses may be disposed, successively from the object side, not only in the order of concave and convex lenses but also in the order of convex and concave lenses.

The wide-zoom lens in accordance with another aspect of the present invention comprises, successively from an object side, a first lens group having a positive refracting power, a second lens group having a negative refracting power, a third lens group having a negative refracting power, and a fourth lens group having a positive refracting power; wherein, when changing power from a wide-angle end to a telephoto end, the second and third lens groups move on an optical axis, while the first and fourth lens groups are fixed with respect to an image face; wherein the first lens group comprises six lens sheets; and wherein the above-mentioned conditional expressions (1) to (4) are satisfied.

BRIEF DESCRIPTION OF THE DRAWINGS

FIGS. 2A to 2D are aberration charts of the wide-angle zoom lens in accordance with Example 1 at its wide-angle end;

FIGS. 3A to 3D are aberration charts of the wide-angle zoom lens in accordance with Example 1 at an intermediate position thereof;

FIGS. 4A to 4D are aberration charts of the wide-angle zoom lens in accordance with Example 1 at its telephoto end;

FIGS. 5A to 5D are aberration charts of the wide-angle zoom lens in accordance with Example 2 at its wide-angle end;

FIGS. 6A to 6D are aberration charts of the wide-angle zoom lens in accordance with Example 2 at an intermediate position thereof;

FIGS. 7A to 7D are aberration charts of the wide-angle zoom lens in accordance with Example 2 at its telephoto end;

FIGS. 8A to 8D are aberration charts of the wide-angle zoom lens in accordance with Example 3 at its wide-angle end;

FIGS. 9A to 9D are aberration charts of the wide-angle zoom lens in accordance with Example 3 at an intermediate position thereof; and FIGS. 10A to 10D are aberration charts of the wide-angle zoom lens in accordance with Example 3 at its telephoto end.

DESCRIPTION OF THE PREFERRED EMBODIMENTS

Figure 1:
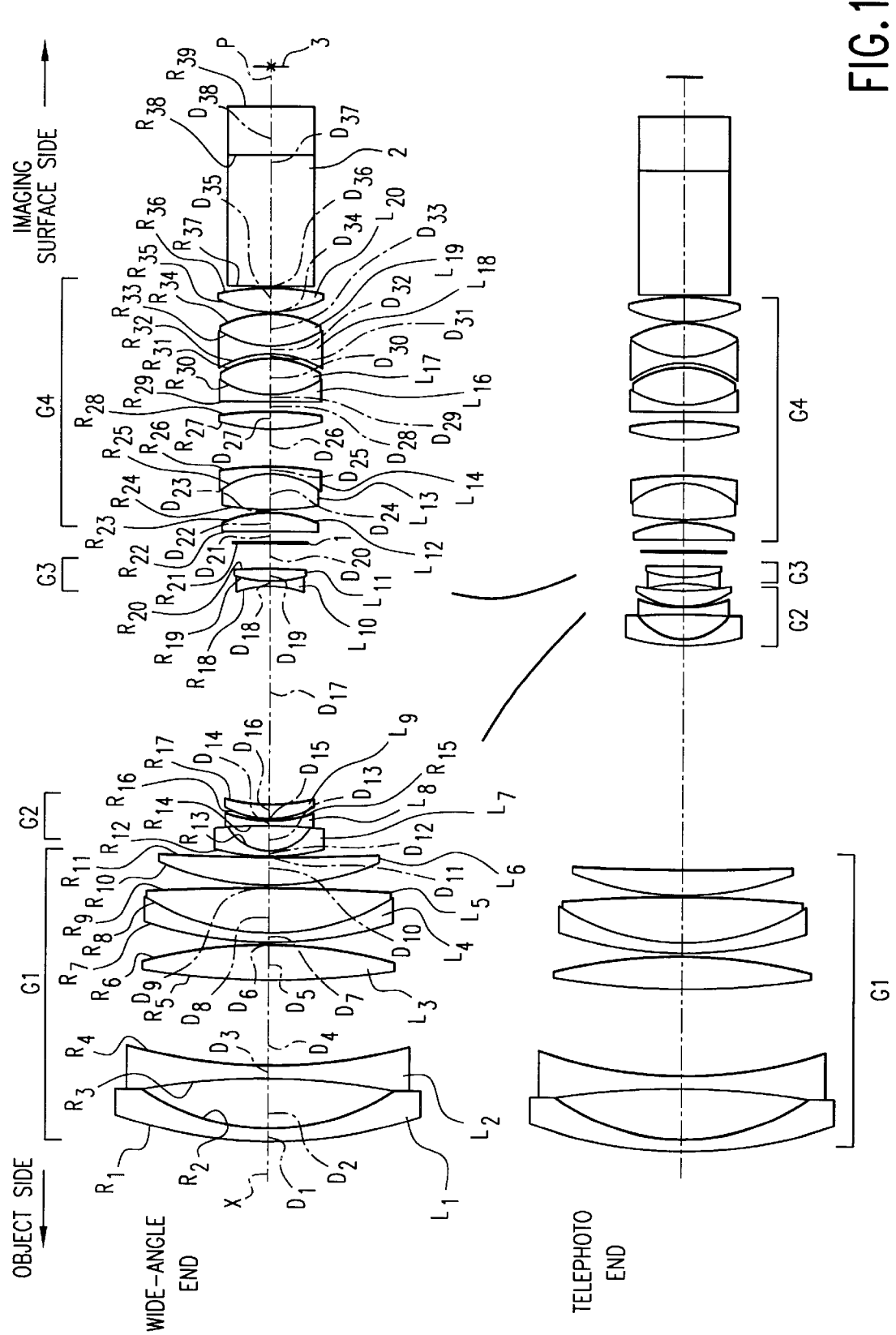
FIG. 1 is a view showing a configuration of a wide-angle zoom lens in accordance with Example 1.

In the following, embodiments of the present invention will be explained with reference to the accompanying drawings.

FIG. 1 is a view showing a configuration of a wide-angle zoom lens in accordance with Example 1 of the present invention, comparing the lens group positions at the wide-angle end and telephoto end of the lens in accordance with Example 1.

As shown in FIG. 1, the wide-angle zoom lens in accordance with an embodiment of the present invention is a zoom lens comprising, successively from the object side, a first lens group $G_1$ functioning as a focusing part and having a positive refracting power, a second lens group $G_2$ functioning as a power-changing part and having a negative refracting power, a third lens group $G_3$ having a negative refracting power for correcting the image face fluctuation caused when changing power, and a fourth lens group $G_4$ which is an imaging relay lens group having a positive refracting power. A stop 1 is disposed between the third lens group $G_3$ and the fourth lens group $G_4$ such as to be fixed with respect to the imaging face. The luminous flux passing through the opening of the stop 1 is converged by the fourth lens group $G_4$ and, by way of a filter unit 2 disposed on the image-face side of the fourth lens group $G_4$, forms an image on the imaging face 3 of a solid-state imaging device (CCD).

Here, as shown in FIG. 1, when changing power from the wide-angle end to the telephoto end, the second lens group $G_2$ monotonously moves along the optical axis from the object side to the image side, the third lens group $G_3$ moves on the optical axis while forming a locus which is convex toward the object, and the first lens group $G_1$ and the fourth lens group $G_4$ are fixed with respect to the image face.

The first lens group $G_1$ comprises, successively from the object side, a first lens $L_1$ made of a concave meniscus lens having a convex face directed onto the object side, a second lens $L_2$ made of a biconcave lens having a face with a larger curvature directed onto the image side, a third lens $L_3$ made of a biconvex lens having a face with a larger curvature directed onto the image side, a cemented lens composed of a fourth lens $L_4$ made of a concave meniscus lens having a convex face directed onto the object side and a fifth lens $L_5$ made of a biconvex lens having a face with a larger curvature directed onto the object side, and a sixth lens $L_6$ made of a convex meniscus lens having a convex face directed onto the object side.

The second lens group $G_2$ comprises, successively from the object side, a seventh lens $L_7$ made of a concave meniscus lens having a convex face directed onto the object side, an eighth lens $L_8$ made of a biconcave lens having a face with a larger curvature directed onto the image side, and a ninth lens $L_9$ made of a convex a meniscus lens having a convex face directed onto the object side.

The third lens group $G_3$ comprises a cemented lens constituted, successively from the object side, by a tenth lens $L_{10}$ made of a biconcave lens having a face with a larger curvature directed onto the object side and an eleventh lens $L_{11}$ made of a convex meniscus lens having a convex face directed onto the object side.

The fourth lens group $G_4$ comprises, successively from the object side, a twelfth lens $L_{12}$ made of a convex meniscus lens having a convex face directed onto the image side, a cemented lens composed of a thirteenth lens $L_3$ made of a biconvex lens having a surface with a larger curvature directed onto the image side and a fourteenth lens $L_{14}$ made of a concave meniscus lens having a convex face directed onto the image side, a fifteenth lens $L_{15}$ made of a biconvex lens having a face with a larger curvature directed onto the object side, a cemented lens composed of a sixteenth lens $L_{16}$ made of a concave meniscus lens having a convex face directed onto the object side and a seventeenth lens $L_{17}$ made of a biconvex lens having a face with a larger curvature directed onto the image side, a cemented lens composed of an eighteenth lens $L_{18}$ made of a biconcave lens having a face with a larger curvature directed onto the object side and a nineteenth lens $L_{19}$ made of a biconvex lens having a face with a larger curvature directed onto the object side, and a twentieth lens $L_{20}$ made of a biconvex lens having a face with a larger curvature directed onto the object side.

The lens in accordance with this embodiment is configured so as to satisfy the following conditional expressions (1) to (4):

$$0.52 < R_4/R_5 < 0.77 \quad (1)$$

$$0.37 < D_4/F_{G1} < 0.58 \quad (2)$$

$$-3.0 < (R_2+R_1)/(R_2-R_1) < -1.0 \quad (3)$$

$$0.40 < F_1/F_2 < 1.75 \quad (4)$$

where $R_4$ is the radius of curvature of the image-side face of the second lens $L_2$;

$R_5$ is the radius of curvature of the object-side face of the third lens $L_3$;

$D_4$ is the air spacing between the second and third lenses $L_2$ and $L_3$;

$F_{G1}$ is the focal length of the first lens group $G_1$;

$R_2$ is the radius of curvature of the image-side face of the first lens $L_1$;

$R_1$ is the radius of curvature of the object-side face of the first lens $L_1$;

$F_1$ is the focal length of the first lens $L_1$; and $F_2$ is the focal length of the second lens $L_2$.

Of the above-mentioned configuration, the six-sheet lens structure constituting the first lens group $G_1$ and the conditional expressions (1) to (4) concerning the lenses in the first lens group $G_1$ make it possible to yield a zoom lens having a wide angle of view, a small size, a light weight, and favorable optical performances. Hence, these features will be explained in detail in the following.

The first lens group $G_1$ is a focusing part fixed with respect to the image face. While a wide converter is externally attached to a typical zoom lens for TV in order to attain a wider angle, three lens sheets ($L_1$, $L_2$, and $L_3$) having a large aperture size with this function are disposed closest to the object and are integrated with the focusing part, such that all the lenses in the first lens group $G_1$ would move when focusing. Among them, the concave faces of the concave lenses of the first and second lenses $L_1$ and $L_2$ function to attain a wider angle. For attaining compactness, the necessary negative power may be obtained by a single concave face. When the number of lens sheets is increased so as to distribute the power among a plurality of concave faces though sacrificing the compactness, however, distortion, curvature of field, and telephoto-side spherical aberration are effectively improved.

The conditional expression (1) defines the ratio between the radius of curvature of the image-side face of the biconcave lens of the second lens $L_2$ and the radius of curvature of the object-side face of the biconvex lens of the third lens $L_3$. Below the lower limit thereof, the negative distortion near the wide-angle end may become so large that it is hard to correct. Beyond the upper limit thereof, astigmatism and spherical aberration are hard to correct at the telephoto end.

The conditional expression (2) relates to the air spacing between the second lens $L_2$ and the third lens $L_3$. Below the lower limit thereof, it becomes hard to correct distortion and astigmatism at the wide-angle end in a well-balanced fashion. Beyond the upper limit thereof, the lens spacing may become so large that the whole lens system is prevented from attaining compactness.

The conditional expression (3) defines lens form parameters of the first lens $L_1$. Below the lower limit thereof, the negative power of the first lens $L_1$ becomes small. Hence, for maintaining the power of the whole lens system, it is necessary for the concave faces of the second lens $L_2$ to have a smaller radius of curvature. In this case, however, vignetting of light beams may unfavorably occur. Beyond the upper limit, coma at the telephoto end may increase to such an extent that correction is difficult.

The conditional expression (4) is a conditional expression for effecting an appropriate power distribution by defining the focal lengths of the first lens $L_1$ and second lens $L_2$. Though the largest lens in the lens system is used as the first lens $L_1$ for attaining a wider angle, it is desirable for the lens to have a small outside diameter in order to attain compactness in the whole lens system. Below the lower limit, the first lens $L_1$ enhances its refracting power in order to attain a balance, thus reducing the outside diameter thereof, whereas the negative distortion at the wide-angle end may become too large. Beyond the upper limit, while distortion can be suppressed at the wide-angle side, it may be disadvantageous for attaining a smaller size.

EXAMPLE 1

The wide-angle zoom lens in accordance with Example 1 has a configuration shown in FIG. 1, which indicates the lens group positions at the wide-angle end and telephoto end of the lens. FIG. 1 is also used for representing the lenses of Examples 2 and 3 since they have a configuration substantially the same as that of Example 1.

In the following, specific data will be shown for Example 1.

Table 1 (follows) shows the radius of curvature R (mm) of each lens face, axial spacing of each lens (center thickness of each lens and air spacing between neighboring lenses) D (mm), and refractive index $N_e$ and Abbe number $\nu_e$ of each lens at e-line in Example 1. Also, the lower part of Table 1(follows) shows the back focus Bf (mm) of the whole system. In Table 1 and its subsequent tables, the numbers referring to the above-mentioned letters successively increase from the object side.

Table 2 (follows) shows the focal length f (mm) of the whole system and variable group spacing (mm) in Example 1, whereas Table 3 (follows) shows the values for the respective conditional expressions in the wide-angle zoom lens of Example 1.

FIGS. 2A to 4D are aberration charts showing various kinds of aberration (spherical aberration, astigmatism, distortion, and transverse aberration) of the wide-angle zoom lens in accordance with Example 1 at the wide-angle end, an intermediate position, and the telephoto end, respectively. In these aberration charts and those subsequent thereto, ω indicates the half angle of view.

As shown in Tables 2 and 3 and FIGS. 2A to 4D, Example 1 satisfies all the conditional expressions (1) to (4) and exhibits the focal length f of the whole lens system within the range of 5.13 to 60.06 mm, a wide angle of view represented by a half angle of view of 39.7 degrees at the wide-angle end, and a brightness represented by the F value within the range of 1.85 to 1.97, thus clearly being a high-performance wide-angle zoom lens which favorably corrects each kind of aberration.

EXAMPLE 2

The configuration of the wide-angle zoom lens in accordance with Example 2 is basically the same as that of Example 1 but differs therefrom in that, in the first lens group $G_1$, the second lens $L_2$ is a concave meniscus lens having a convex face directed onto the object side, the fourth lens $L_4$ is a biconvex lens having a face with a larger curvature directed onto the image side, and the fifth lens $L_5$ is a concave meniscus lens having a convex face directed onto the image side. As with Example 1, the fourth lens $L_4$ and the fifth lens $L_5$ constitute a cemented lens.

Further, in the fourth lens group $G_4$, the twelfth lens $L_{12}$ is changed to a biconvex lens having a face with a larger curvature directed onto the image side, and the sixteenth lens $L_{16}$ is changed to a biconcave lens having a face with a larger curvature directed onto the image side. As with Example 1, the sixteenth lens $L_{16}$ and the seventeenth lens $L_{17}$ constitute a cemented lens.

The first lens group $G_1$ yields effects similar to those in Example 1, though the power distribution for attaining a wider angle is different from that in Example 1 since the object-side face of the second lens $L_2$ is a convex face.

Table 4 (follows) shows the radius of curvature R (mm) of each lens face, axial spacing of each lens (center thickness of each lens and air spacing between neighboring lenses) D (mm), and refractive index Ne and Abbe number $\nu_e$ of each lens at e-line in Example 2. Also, the lower part of Table 4 shows the back focus Bf (mm) of the whole system.

Table 5 (follows) shows the focal length f (mm) of the whole system and variable group spacing (mm) in Example 2, whereas the above-mentioned Table 3 shows the values for the respective conditional expressions in the wide-angle zoom lens of Example 2.

FIGS. 5A to 7D are aberration charts showing various kinds of aberration (spherical aberration, astigmatism, distortion, and transverse aberration) of the wide-angle zoom lens in accordance with Example 2 at the wide-angle end, an intermediate position, and the telephoto end, respectively.

As shown in Tables 3 and 5 and FIGS. 5A to 7D, Example 2 satisfies all the conditional expressions (1) to (4) and exhibits the focal length f of the whole lens system within the range of 5.15 to 60.23 mm, a wide angle of view represented by a half angle of view of 39.7 degrees at the wide-angle end, and a brightness represented by the F value within the range of 1.85 to 1.99, thus clearly being a high-performance wide-angle zoom lens which favorably corrects each kind of aberration.

EXAMPLE 3

The configuration of the wide-angle zoom lens in accordance with Example 3 is basically the same as that of Example 1 but differs therefrom in that, in the fourth lens group $G_4$, the fourteenth lens $L_{14}$ is a biconcave lens having a face with a larger curvature directed onto the object side, the seventeenth lens $L_{17}$ is a biconvex lens having a face with a larger curvature directed onto the object side, and the eighteenth lens $L_{18}$ is a concave meniscus lens having a convex face directed onto the object side. As with Example 1, the thirteenth lens $L_{13}$ and fourteenth lens $L_{14}$, the sixteenth lens $L_{16}$, and seventeenth lens $L_{17}$, the eighteenth lens $L_{18}$ and nineteenth lens $L_{19}$ constitute cemented lenses, respectively.

Table 6 (follows) shows the radius of curvature R (mm) of each lens face, axial spacing of each lens (center thickness of each lens and air spacing between neighboring lenses) D (mm), and refractive index $N_e$ and Abbe number $v_e$ of each lens at e-line in Example 3. Also, the lower part of Table 6 shows the back focus Bf (mm) of the whole system.

Table 7 (follows) shows the focal length f (mm) of the whole system and variable group spacing (mm) in Example 3, whereas the above-mentioned Table 3 shows the values for the respective conditional expressions in the wide-angle zoom lens of Example 3.

FIGS. 8A to 10D are aberration charts showing various kinds of aberration (spherical aberration, astigmatism, distortion, and transverse aberration) of the wide-angle zoom lens in accordance with Example 3 at the wide-angle end, an intermediate position, and the telephoto end, respectively.

As shown in Tables 3 and 7 and FIGS. 8A to 10D, Example 3 satisfies all the conditional expressions (1) to (4) and exhibits the focal length f of the whole lens system within the range of 3.92 to 45.82 mm, a wide angle of view represented by a half angle of view of 38.8 degrees at the wide-angle end, and a brightness represented by the F value within the range of 1.42 to 1.52, thus clearly being a high-performance wide-angle zoom lens which favorably corrects each kind of aberration.

As explained in the foregoing, the present invention can attain a wide-angle zoom lens having high performances, a small size, and a light weight, and favorably correcting aberration while achieving a wide angle of view represented by a half angle of view of about 40 degrees.

Since the first lens group requiring relatively large lenses to be used therein has six sheets of lenses, the lens system as a whole can attain a smaller size and a lighter weight, while simplifying its configuration and making it possible to cut down the cost. The wide-angle zoom lens in accordance with the present invention yields such a high accuracy that can sufficiently be used as a professional TV camera lens, thus satisfying the demand for TV cameras with a wide angle of view, a small size, a light weight, and a low cost.

TABLE 1

|    | R        | D              | $N_e$   | $v_e$ |
|----|----------|----------------|---------|-------|
| 1  | 103.526  | 2.80           | 1.72407 | 41.7  |
| 2  | 50.423   | 11.98          |         |       |
| 3  | −134.939 | 2.60           | 1.72793 | 37.7  |
| 4  | 108.997  | 18.90          |         |       |
| 5  | 202.293  | 7.91           | 1.62286 | 60.1  |
| 6  | −99.053  | 0.20           |         |       |
| 7  | 107.029  | 2.00           | 1.85503 | 23.6  |
| 8  | 52.340   | 10.45          | 1.71615 | 53.6  |
| 9  | −270.591 | 0.21           |         |       |
| 10 | 65.524   | 5.80           | 1.71615 | 53.6  |
| 11 | 394.365  | (variable, D11)|         |       |

TABLE 1-continued

|    | R          | D              | $N_e$   | $v_e$ |
|----|------------|----------------|---------|-------|
| 12 | 57.869     | 1.00           | 1.75844 | 52.1  |
| 13 | 11.509     | 5.91           |         |       |
| 14 | −130.146   | 1.00           | 1.80811 | 46.3  |
| 15 | 34.946     | 0.20           |         |       |
| 16 | 19.113     | 3.16           | 1.81263 | 25.2  |
| 17 | 52.561     | (variable, D17)|         |       |
| 18 | −19.593    | 0.85           | 1.75844 | 52.1  |
| 19 | 26.022     | 2.60           | 1.85503 | 23.6  |
| 20 | 455.894    | (variable, D20)|         |       |
| 21 | (aperture stop) | 2.52      |         |       |
| 22 | −1257.982  | 3.99           | 1.72056 | 47.6  |
| 23 | −29.45     | 0.81           |         |       |
| 24 | 74.264     | 7.87           | 1.60718 | 37.8  |
| 25 | −18.342    | 1.20           | 1.82016 | 46.4  |
| 26 | −84.122    | 8.06           |         |       |
| 27 | 38.920     | 3.96           | 1.51976 | 52.2  |
| 28 | −69.106    | 2.51           |         |       |
| 29 | 63568.747  | 1.20           | 1.83932 | 36.9  |
| 30 | 20.952     | 8.18           | 1.48915 | 70.1  |
| 31 | −0.569     | 0.76           |         |       |
| 32 | −22.164    | 1.42           | 1.83932 | 36.9  |
| 33 | 22.527     | 6.92           | 1.48915 | 70.1  |
| 34 | −26.823    | 0.44           |         |       |
| 35 | 26.838     | 5.51           | 1.48915 | 70.1  |
| 36 | −40.193    | 0.00           |         |       |
| 37 | ∞          | 29.00          | 1.60718 | 37.8  |
| 38 | ∞          | 11.00          | 1.51825 | 63.8  |
| 39 | ∞          |                |         |       |
| Bf | 8.8171     |                |         |       |

TABLE 2

|     | Wide-angle end | Intermediate position | Telephoto end |
|-----|----------------|-----------------------|---------------|
| F   | 5.13           | 20.53                 | 60.06         |
| D11 | 0.8465         | 35.4915               | 49.1420       |
| D17 | 47.5809        | 11.0518               | 2.1531        |
| D20 | 5.8444         | 7.7284                | 2.9765        |

TABLE 3

|                            | Example 1 | Example 2 | Example 3 |
|----------------------------|-----------|-----------|-----------|
| (1) $R_4/R_5$              | 0.54      | 0.75      | 0.54      |
| (2) $D_4/F_{G1}$           | 0.39      | 0.53      | 0.56      |
| (3) $(R_2 + R_1)/(R_2 − R_1)$ | −2.9   | −1.1      | −1.9      |
| (4) $F_1/F_2$              | 1.68      | 0.44      | 1.40      |

TABLE 4

|    | R        | D              | $N_e$   | $v_e$ |
|----|----------|----------------|---------|-------|
| 1  | 1226.237 | 2.80           | 1.72391 | 43.4  |
| 2  | 60.960   | 8.43           |         |       |
| 3  | 3270.402 | 2.60           | 1.72793 | 37.7  |
| 4  | 141.715  | 25.54          |         |       |
| 5  | 188.966  | 7.91           | 1.60548 | 60.5  |
| 6  | −92.586  | 0.20           |         |       |
| 7  | 128.799  | 9.86           | 1.71615 | 53.6  |
| 8  | −82.533  | 2.00           | 1.85503 | 23.6  |
| 9  | −792.909 | 0.21           |         |       |
| 10 | 66.361   | 5.18           | 1.71615 | 53.6  |
| 11 | 434.705  | (variable,D11) |         |       |
| 12 | 50.644   | 1.00           | 1.75844 | 52.1  |
| 13 | 11.418   | 5.91           |         |       |
| 14 | −81.701  | 1.00           | 1.79196 | 47.1  |
| 15 | 38.592   | 0.20           |         |       |
| 16 | 19.931   | 3.16           | 1.85503 | 23.6  |
| 17 | 55.293   | (variable, D17)|         |       |
| 18 | −19.422  | 0.85           | 1.77621 | 49.3  |

TABLE 4-continued

| | R | D | $N_e$ | $v_e$ |
|---|---|---|---|---|
| 19 | 25.382 | 2.60 | 1.85503 | 23.6 |
| 20 | 1075.217 | (variable, D20) | | |
| 21 | (aperture stop) | 2.52 | | |
| 22 | 7824.171 | 3.99 | 1.72056 | 47.6 |
| 23 | −30.383 | 0.20 | | |
| 24 | 83.397 | 7.68 | 1.62409 | 36.0 |
| 25 | −17.952 | 1.20 | 1.80811 | 46.3 |
| 26 | −83.587 | 9.07 | | |
| 27 | 40.086 | 4.18 | 1.51678 | 54.3 |
| 28 | −63.485 | 1.62 | | |
| 29 | −3013.486 | 1.20 | 1.83932 | 36.9 |
| 30 | 20.376 | 8.29 | 1.48915 | 70.1 |
| 31 | −20.142 | 0.42 | | |
| 32 | −21.821 | 1.20 | 1.83932 | 36.9 |
| 33 | 22.334 | 6.52 | 1.51872 | 64.0 |
| 34 | −29.398 | 0.20 | | |
| 35 | 27.411 | 5.73 | 1.48915 | 70.1 |
| 36 | −38.813 | 0.00 | | |
| 37 | ∞ | 29.00 | 1.60718 | 37.8 |
| 38 | ∞ | 11.00 | 1.51825 | 63.8 |
| 39 | ∞ | | | |
| Bf | 10.1926 | | | |

TABLE 5

| | Wide-angle end | Intermediate position | Telephoto end |
|---|---|---|---|
| f | 5.15 | 20.59 | 60.23 |
| D11 | 0.8465 | 35.4465 | 49.0550 |
| D17 | 47.5809 | 11.2733 | 2.5262 |
| D20 | 5.8444 | 7.5521 | 2.6906 |

TABLE 6

| | R | D | $N_e$ | $v_e$ |
|---|---|---|---|---|
| 1 | 236.785 | 2.00 | 1.72391 | 43.4 |
| 2 | 70.596 | 8.04 | | |
| 3 | −559.238 | 2.00 | 1.72793 | 37.7 |
| 4 | 83.743 | 26.91 | | |
| 5 | 156.030 | 7.16 | 1.60548 | 60.5 |
| 6 | −106.299 | 0.20 | | |
| 7 | 125.072 | 2.00 | 1.81263 | 25.2 |
| 8 | 48.450 | 10.45 | 1.71615 | 53.6 |
| 9 | −412.692 | 0.21 | | |
| 10 | 61.404 | 5.80 | 1.71615 | 53.6 |
| 11 | 229.293 | (variable, D11) | | |
| 12 | 43.419 | 1.00 | 1.75844 | 52.1 |
| 13 | 11.108 | 5.91 | | |
| 14 | −81.924 | 1.00 | 1.80811 | 46.3 |
| 15 | 33.184 | 0.20 | | |
| 16 | 19.498 | 3.16 | 1.85503 | 23.6 |
| 17 | 68.994 | (variable, D17) | | |
| 18 | −19.378 | 0.85 | 1.77621 | 49.3 |
| 19 | 25.518 | 2.60 | 1.85503 | 23.6 |
| 20 | 1062.969 | (variable, D20) | | |
| 21 | (aperture stop) | 2.91 | | |
| 22 | −152.231 | 3.35 | 1.67765 | 31.8 |
| 23 | −30.734 | 4.42 | | |
| 24 | 115.441 | 7.89 | 1.59910 | 39.0 |
| 25 | '18.085 | 1.20 | 1.82016 | 46.4 |
| 26 | 398.038 | 0.20 | | |
| 27 | 49.284 | 4.17 | 1.57046 | 42.5 |
| 28 | −65.740 | 9.86 | | |
| 29 | 78.739 | 2.00 | 1.85503 | 23.6 |
| 30 | 35.906 | 6.23 | 1.48915 | 70.1 |
| 31 | −54.798 | 0.20 | | |
| 32 | 59.853 | 1.20 | 1.85503 | 23.6 |
| 33 | 20.368 | 5.68 | 1.51872 | 64.0 |
| 34 | −145.703 | 0. 20 | | |
| 35 | 23.840 | 4.47 | 1.48915 | 70.1 |
| 36 | −3873.230 | 0.00 | | |
| 37 | ∞ | 21.00 | 1.70559 | 40.9 |
| 38 | ∞ | 6.75 | 1.51825 | 63.8 |
| 39 | ∞ | | | |
| Bf | 11.1534 | | | |

TABLE 7

| | Wide-angle end | Intermediate position | Telephoto end |
|---|---|---|---|
| f | 3.92 | 15.66 | 45.82 |
| D11 | 0.8465 | 35.4543 | 48.9965 |
| D17 | 47.5809 | 11.4044 | 2.9174 |
| D20 | 5.8444 | 7.4131 | 2.3579 |

What is claimed is:

1. A wide-angle zoom lens comprising, successively from an object side, a first lens group having a positive refracting power, a second lens group having a negative refracting power, a third lens group having a negative refracting power, and a fourth lens group having a positive refracting power; wherein, when changing power from a wide-angle end to a telephoto end, said second and third lens groups move on an optical axis, while said first and fourth lens groups are fixed with respect to an image face; and wherein said first lens group comprises, successively from the object side, a first lens made of a concave meniscus lens having a convex face directed onto the object side, a second lens made of a biconcave lens, a third lens made of a biconvex lens, fourth and fifth lenses constituting a cemented lens made of concave and convex lenses, and a sixth lens made of a convex meniscus lens having a convex face directed onto the object side.

2. A wide-angle zoom lens according to claim 1, satisfying the following conditional expressions (1) to (4):

$$0.52 < R_4/R_5 < 0.77 \quad (1)$$

$$0.37 < D_4/F_{G1} < 0.58 \quad (2)$$

$$-3.0 < (R_2+R_1)/(R_2-R_1) < -1.0 \quad (3)$$

$$0.40 < F_1/F_2 < 1.75 \quad (4)$$

where $R_4$ is the radius of curvature of the image-side face of the second lens;

$R_5$ is the radius of curvature of the object-side face of the third lens;

$D_4$ is the air spacing between the second and third lenses;

$F_{G1}$ is the focal length of the first lens group;

$R_2$ is the radius of curvature of the image-side face of the first lens;

$R_1$ is the radius of curvature of the object-side face of the first lens;

$F_1$ is the focal length of the first lens; and $F_2$ is the focal length of the second lens.

3. A wide-angle zoom lens comprising, successively from an object side, a first lens group having a positive refracting power, a second lens group having a negative refracting power, a third lens group having a negative refracting power, and a fourth lens group having a positive refracting power; wherein, when changing power from a wide-angle end to a telephoto end, said second and third lens groups move on an optical axis, while said first and fourth lens groups are fixed with respect to an image face; and wherein said first lens group comprises six lens sheets, satisfying the following conditional expressions (1) to (4):

$$0.52 < R_4/R_5 < 0.77 \quad (1)$$

$$0.37 < D_4/F_{G1} < 0.58 \quad (2)$$

$$-3.0 < (R_2+R_1)/(R_2-R_1) < -1.0 \quad (3)$$

$$0.40 < F_1/F_2 < 1.75 \quad (4)$$

where $R_4$ is the radius of curvature of the image-side face of the second lens;

$R_5$ is the radius of curvature of the object-side face of the third lens;

$D_4$ is the air spacing between the second and third lenses;

$F_{G1}$ is the focal length of the first lens group;

$R_2$ is the radius of curvature of the image-side face of the first lens;

$R_1$ is the radius of curvature of the object-side face of the first lens;

$F_1$ is the focal length of the first lens; and $F_2$ is the focal length of the second lens.

* * * * *